F. D. WILSON.
STEERING WHEEL.
APPLICATION FILED JUNE 26, 1917. RENEWED NOV. 15, 1921.
1,419,434.
Patented June 13, 1922.
2 SHEETS—SHEET 2.
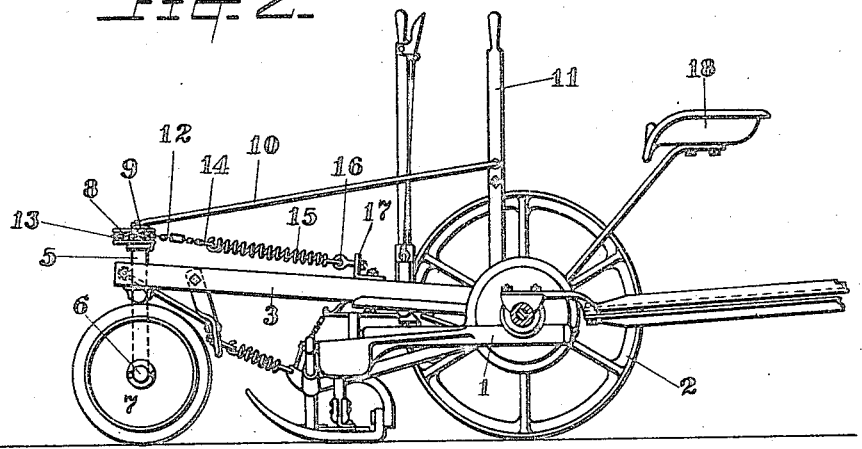
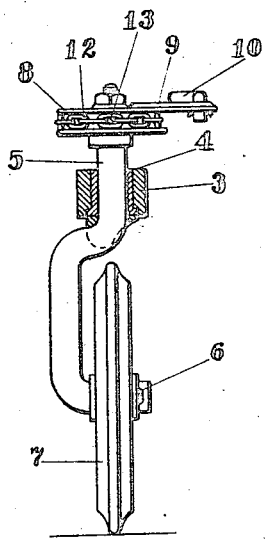

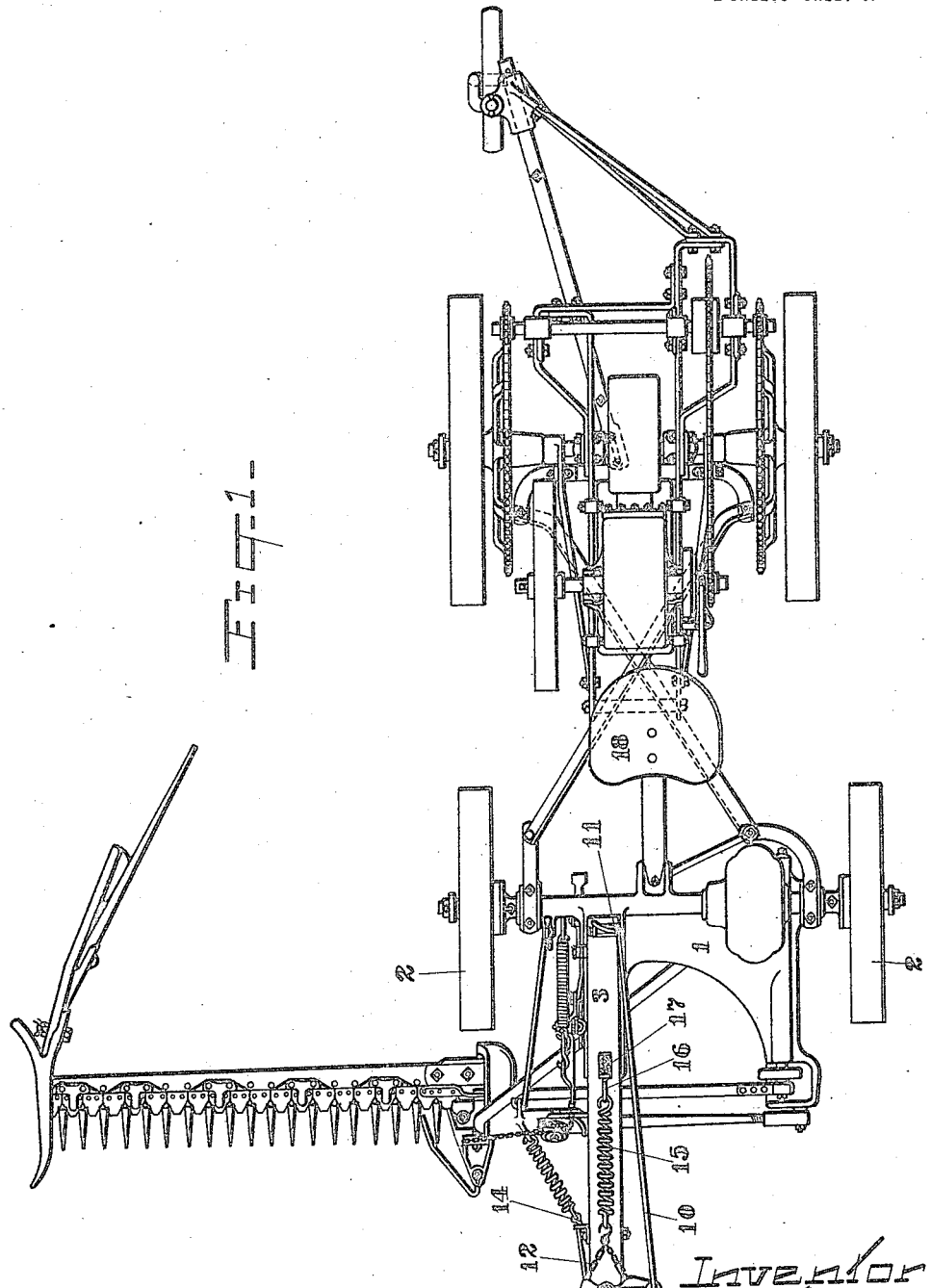

UNITED STATES PATENT OFFICE.

FREDERICK D. WILSON, OF MOLINE, ILLINOIS, ASSIGNOR TO DEERE AND COMPANY, OF MOLINE, ILLINOIS, A CORPORATION OF ILLINOIS.

STEERING WHEEL.

1,419,434.  Specification of Letters Patent. Patented June 13, 1922.

Application filed June 26, 1917, Serial No. 177,019. Renewed November 15, 1921. Serial No. 515,425.

*To all whom it may concern:*

Be it known that I, FREDERICK D. WILSON, a citizen of the United States, residing at Moline, in the county of Rock Island and State of Illinois, have invented certain new and useful Improvements in Steering Wheels, of which the following is a specification, reference being had therein to the accompanying drawing.

My invention relates to steering devices, especially of that class adapted to be attached to the front or rear of a wheeled body, and the object of my invention is to provide a steering device readily operative and which is semi-automatic in operation.

Referring to the drawings in which similar numerals indicate identical parts—

Figure 1 is a plan view of a power propelled mower to which my device is attached.

Figure 2 is a side view of the mower and steering mechanism, and

Figure 3 is a detail of the wheel mounting in part section.

I have shown my device as applied to a power propelled mower and operating forward thereof, but it is equally as efficient in operation when applied to other classes of agricultural or other wheeled machines; it is also adapted to be utilized as a rear or front steering wheel on wheeled bodies having the motive power carried by the body itself.

I show a mower of a well known type comprising a frame 1, supporting wheels 2, and the cutting mechanism of the usual construction operated by power from the wheels 2. Projecting forwardly from the mower, and mounted thereon, is a stub pole 3, having on its forward end a bearing 4 in which is rotatably journaled the upper vertical end 5 of a crank axle which is bent outwardly below the stub pole 3 and terminates in a horizontal spindle 6 on which is mounted, to revolve freely thereon, a steering wheel 7.

Rigidly secured on the upper end of the crank axle is a sheave 8, horizontally disposed and provided, preferably integral therewith, with a laterally extending arm 9 having an opening in which is hooked an end of a rod 10; the rod 10 extends rearwardly to a hand lever 11 to which it is pivotally connected intermediate the ends of the lever, the latter being pivotally and loosely mounted on the stub pole 3. A chain 12 passes around the sheave 8 and is prevented from sliding thereon by a pin 13 in the groove of the sheave and projecting through the central link. The ends of the chain 12 are brought together and secured to a hook 14 which is connected to a coil spring 15, the latter being under tension between said hook and an eye bolt 16 secured to a bracket 17 on the stub pole 3.

The tension of the spring 15, secured around the sheave 8 by the pin 13, prevents the sheave 8 from turning except by applied power, and as the sheave 8 is rigidly secured on the upper end of the crank axle the normal position of the wheel 7 is parallel with the direct line of advance of the machine. When it is desired to change the line of advance to cut in another direction the operator, from his seat 18 on the mower, rocks the lever 11 forwardly to steer the wheel 7 to the right, and in a reverse direction to steer the wheel 7 to the left; in whatever direction the turn is made the wheel 7 is automatically returned to its normal position by the spring 15 as soon as the operator releases his hold upon the lever 11.

As previously stated, and as shown in the drawings, my device is attached to a mower propelled by mechanical power applied thereto, this power comprising a tractor flexibly connected to the rear of the mower so as to follow the lead thereof when in motion. This tractor and connection is more clearly set forth in a joint application of Robert C. Livesay and myself of even date herewith, to which reference is made.

What I claim is—

1. A steering device comprising a support, a vertically disposed crank axle journaled thereon, a wheel on said axle, a lever having a connection with said axle and adapted to rotate the latter to steer the wheel and change the direction of travel, a chain having a fixed connection with the axle and extending rearwardly from opposite sides thereof, and a coiled spring attached to the support and connected to the chain centrally of the rearward extension thereof.

2. A steering device comprising a support, a vertically disposed crank axle journaled thereon, a wheel on said axle, a sheave rigidly secured on said axle, a chain passing around said sheave and attached thereto intermediate its ends, an arm extending laterally from said sheave, a rod connecting said arm with a lever on the support whereby, when the lever is operated, the axle is rotated to steer the wheel, and a coil spring connected to the ends of said chain and to a bracket on the support and tensioned therebetween to hold said wheel in its normal position and to automatically return it thereto when released from the operation of the lever.

3. A steering device comprising a support, a vertically disposed crank axle journaled thereon, a wheel on said axle, a sheave rigidly secured on the axle, a chain passing around the sheave and attached thereto intermediate its ends, a lever pivotally mounted on the support, a rod connected to the lever and to the sheave at one side of the center of the latter whereby, when the lever is operated, the axle is rotated to steer the wheel, and a coil spring connected to the ends of said chain and to the support and tensioned to hold said wheel to travel in a direct line and to automatically return it thereto when released from the operation of the lever.

4. A steering device comprising a support, a vertically disposed crank axle journaled thereon, a wheel on said axle, a sheave rigidly secured on the axle, a chain passing around said sheave and attached thereto intermediate its ends, and a coil spring connected to the ends of said chain and to a bracket on the support and exerting its tension to automatically hold the wheel in a direct line of travel.

In testimony whereof I affix my signature, in presence of two witnesses.

FREDERICK D. WILSON.

Witnesses:
 JESSIE SIMSER,
 W. G. DUFFIELD.